(12) United States Patent
Ichikawa

(10) Patent No.: US 11,804,075 B2
(45) Date of Patent: Oct. 31, 2023

(54) EMOTION DETERMINATION DEVICE, EMOTION DETERMINATION METHOD, AND NON-TRANSITORY STORAGE MEDIUM

(71) Applicant: TOYOTA JIDOSHA KABUSHIKI KAISHA, Toyota (JP)

(72) Inventor: Midori Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 243 days.

(21) Appl. No.: 17/314,119

(22) Filed: May 7, 2021

(65) Prior Publication Data
US 2021/0397825 A1 Dec. 23, 2021

(30) Foreign Application Priority Data
Jun. 23, 2020 (JP) .................. 2020-108272

(51) Int. Cl.
G06V 40/16 (2022.01)
B60W 40/08 (2012.01)
G06V 20/59 (2022.01)
G06F 18/2113 (2023.01)
G06F 18/2431 (2023.01)
G06V 10/75 (2022.01)
G06F 18/2413 (2023.01)

(52) U.S. Cl.
CPC .......... *G06V 40/176* (2022.01); *B60W 40/08* (2013.01); *G06F 18/2113* (2023.01); *G06F 18/2413* (2023.01); *G06F 18/2431* (2023.01); *G06V 10/751* (2022.01); *G06V 20/597* (2022.01); *B60W 2040/089* (2013.01); *B60W 2420/42* (2013.01); *B60W 2540/22* (2013.01); *G06T 2207/30201* (2013.01)

(58) Field of Classification Search
None
See application file for complete search history.

(56) References Cited

U.S. PATENT DOCUMENTS

| 2017/0311863 | A1 | 11/2017 | Matsunaga | |
| 2020/0210735 | A1* | 7/2020 | Matsuo | G06V 20/58 |
| 2020/0410217 | A1* | 12/2020 | Sugimoto | G06F 3/011 |
| 2022/0277570 | A1* | 9/2022 | Takamoto | G06V 40/168 |

FOREIGN PATENT DOCUMENTS

| JP | 2016-149063 A | 8/2016 |
| JP | 2019-200656 A | 11/2019 |
| WO | WO 2019/193781 A1 | 10/2019 |

* cited by examiner

*Primary Examiner* — Emily C Terrell
*Assistant Examiner* — Nathan J Bloom
(74) *Attorney, Agent, or Firm* — Oblon, McClelland, Maier & Neustadt, L.L.P.

(57) ABSTRACT

An emotion determination device includes a memory and a processor connected to the memory. The processor is configured to acquire a facial image of a user, set an evaluation value for each of plural emotion classifications including a neutral state based on the acquired facial image, compute a correction value using an evaluation value set based on a neutral facial image acquired at a timing corresponding to a neutral state, and determine an emotion of the user by applying the computed correction value to the set evaluation values.

11 Claims, 7 Drawing Sheets

FIG.5A
Neutral: 40%  Happy: 0%  Irritated: 50%  Nervous: 5%  Tired:
⇒ Δ = 50 (Irritated) - 40 (Neutral) = 10
Neutral: 5%  Happy: 40%  Irritated: 50%  Nervous: 5%  Tired:
⇒ 50 (Irritated) - 40 (Happy) = 10 ≦
⇒ Happy
FIG.5B
Neutral: 5%  Happy: 40%  Irritated: 50%  Nervous: 5%  Tired:
⇒ Irritated

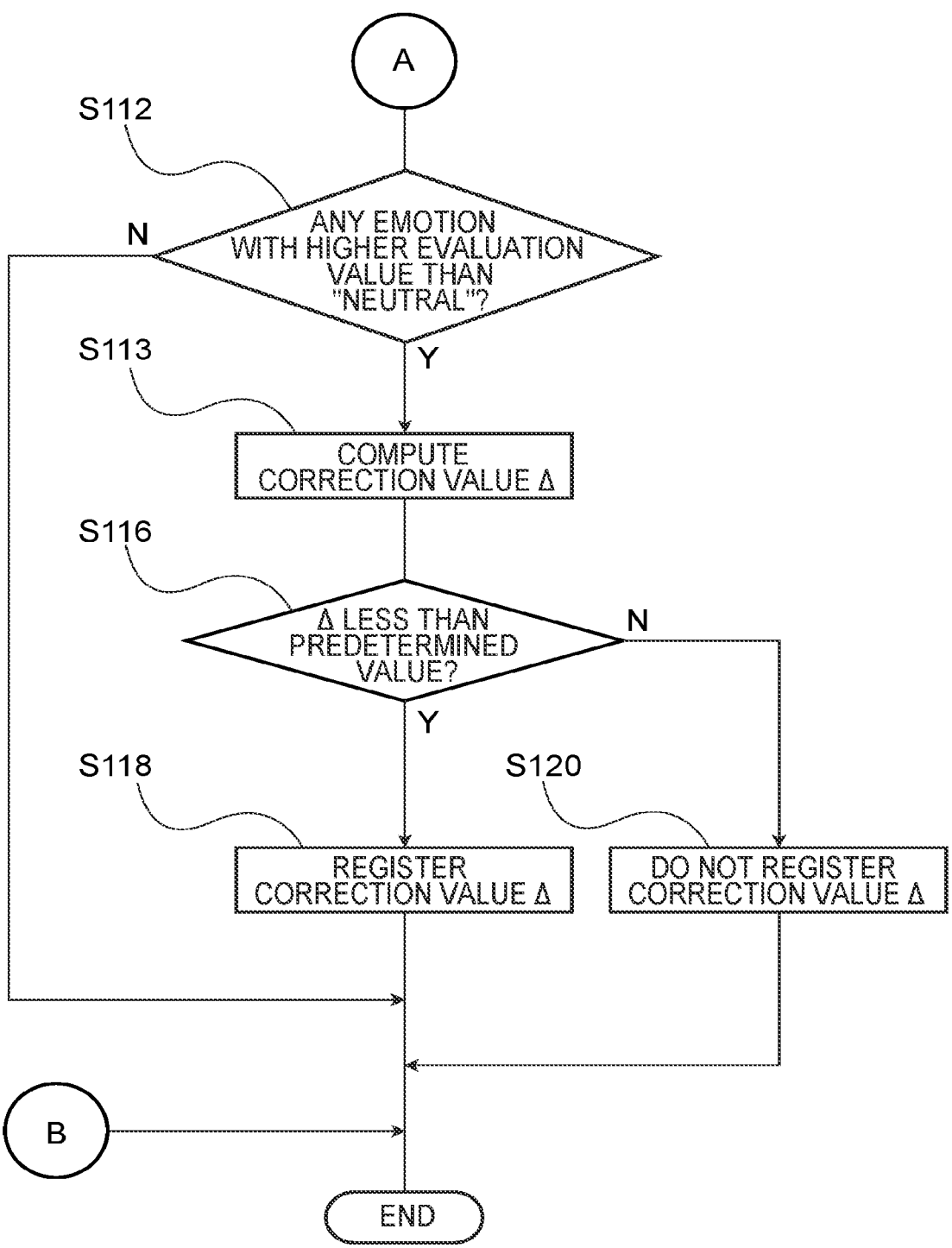

EMOTION DETERMINATION DEVICE, EMOTION DETERMINATION METHOD, AND NON-TRANSITORY STORAGE MEDIUM

CROSS-REFERENCE TO RELATED APPLICATION

This application is based on and claims priority under 35 USC 119 from Japanese Patent Application No. 2020-108272 filed on Jun. 23, 2020, the disclosure of which is incorporated by reference herein.

BACKGROUND

Technical Field

The present disclosure relates to an emotion determination device, an emotion determination method, and a non-transitory storage medium.

International Publication Application (WO) No. 2019/193781 discloses an example of an emotion determination device that determines an emotion of a user. The device disclosed in WO No. 2019/193781 acquires a first evaluation value set of collected evaluation values that correspond to respective emotion attributes, and executes correction processing according to a relationship between the first evaluation value set and a second evaluation value set that was acquired prior to the first evaluation value set. More specifically, in a case in which a difference between an evaluation values in the first evaluation value set and in second evaluation value set does not exceed a criterion, an emotion attribute correction value applied to the highest evaluation value is decreased, while other emotion attribute correction values are uniformly increased such that correction is performed to gradually increase the uniformity of the evaluation values for each emotion.

The device disclosed in WO No. 2019/193781 performs correction to increase the uniformity of the evaluation values for each emotion such that slight changes in facial expression are reflected in the emotions. However, there is a possibility that incorrect emotions could be output due to image detection error or the like, thus leaving room for improvements with respect to increasing precision.

SUMMARY

The present disclosure obtains an emotion determination device, an emotion determination method, and a program capable of precisely determining emotions, even taking into account individual differences in facial expression.

An emotion determination device of a first aspect includes an image acquisition section configured to acquire a facial image of a user, an evaluation value setting section configured to set an evaluation value for each of plural emotion classifications including a neutral state based on the facial image acquired by the image acquisition section, a correction value computation section configured to compute a correction value using an evaluation value set based on a neutral facial image acquired by the image acquisition section at a timing corresponding to a neutral state, and an emotion determination section configured to determine an emotion of the user by applying the correction value computed by the correction value computation section to the evaluation values set by the evaluation value setting section.

In the emotion determination device of the first aspect, the facial image of the user is acquired by the image acquisition section. The evaluation value setting section sets an evaluation value for each of the plural emotion classifications based on the facial image acquired by the image acquisition section.

Note that the emotion determination device includes the correction value computation section. The correction value computation section computes the correction value using the evaluation value set based on the neutral facial image acquired by the image acquisition section at a timing corresponding to the neutral state.

The emotion determination section determines the emotion of the user by applying the correction value to the respective emotion evaluation values set by the evaluation value setting section. By taking the facial expression of the user when in the neutral state as a reference and employing the evaluation value set based on the facial image corresponding to the neutral state, evaluation values can be suppressed from varying as a result of individual differences.

An emotion determination device of a second aspect is the first aspect, wherein in a case in which an emotion corresponding to a highest evaluation value among the evaluation values set by the evaluation value setting section based on the neutral facial image is another emotion other than the neutral state, the correction value computation section is configured to take as the correction value a difference between the evaluation value for the other emotion and the evaluation value for the neutral state.

In the emotion determination device of the second aspect, in a case in which the emotion corresponding to the highest evaluation value among the evaluation values set based on the neutral facial image is another emotion other than the neutral state, the correction value computation section takes as the correction value the difference between the evaluation value for the other emotion and the evaluation value for the neutral state. This enables divergence in emotions determined by the emotion determination section between the neutral state of the user and a neutral state of a general model to be corrected. Note that the "other emotion" referred to here indicates an emotion such as "happy", "surprised", "angry", "sad", "nervous", or "tired".

An emotion determination device of a third aspect is the second aspect, wherein the emotion determination section is further configured to apply the correction value in a case in which the emotion set with the highest evaluation value by the evaluation value setting section is the other emotion, and configured to not apply the correction value in a case in which the emotion set with the highest evaluation value by the evaluation value setting section is an emotion other than the other emotion.

In the emotion determination device of the third aspect, the correction value is applied in a case in which the emotion set with the highest evaluation value by the evaluation value setting section is the other emotion. This enables the difference between the evaluation values for the user and evaluation values for a general model to be suitably absorbed. On the other hand, the correction value is not applied in a case in which the emotion is an emotion other than the other emotion. Thus, in a case in which the emotion is an emotion other than the other emotion, the emotion is determined by the emotion determination section based on evaluation values for a general model.

An emotion determination device of a fourth aspect is the third aspect, wherein in a case in which the emotion set with the highest evaluation value is the other emotion, the emotion determination section is configured to determine the emotion of the user to be a second-placed emotion corresponding to a second highest evaluation value in a case in which a difference between the evaluation value for the second-placed emotion and the evaluation value for the other emotion is either the same as the correction value or less than the correction value.

In the emotion determination device of the fourth aspect, in the case of a user who has a facial expression close to that of the other emotion when in the neutral state, the other emotion would be incorrectly determined if the correction value were not applied. To address this, the emotion of the user is taken to be the second-placed emotion in a case in which the difference between the evaluation value for the second-placed emotion and the evaluation value for the other emotion is either the same as the correction value or less than the correction value. This enables emotions to be determined more accurately, even for users with evaluation values that differ from those of a general model in the neutral state.

An emotion determination device of a fifth aspect is any one of the first aspect to the fourth aspect, wherein the image acquisition section is further configured to acquire a facial image of a driver as the neutral facial image in a case in which a vehicle is in a predetermined travel state and a driver is in a predetermined driving state.

In the emotion determination device of the fifth aspect, the facial image taken as the neutral facial image is acquired based on the travel state of the vehicle and the driving state of the driver. This enables the facial image of the neutral state to be acquired with better precision than in a case in which the neutral facial image is acquired based on only one of the travel state or the driving state.

An emotion determination device of a sixth aspect is the fifth aspect, wherein the predetermined travel state is a state in which the vehicle is traveling straight ahead.

In the emotion determination device of the sixth aspect, the gaze of the driver is directed ahead of the vehicle in the state in which the vehicle is traveling straight ahead, thereby enabling the facial image of the neutral state to be acquired with better precision than in a case in which, for example, the facial image is acquired at the timing corresponding to a left or right turn.

An emotion determination device of a seventh aspect is the fifth aspect, wherein the predetermined driving state is a state in which the driver is not speaking.

In the emotion determination device of the seventh aspect, a non-speaking state of the driver is more likely to represent the neutral state than a speaking state. This enables the facial image of the neutral state to be acquired with good precision.

An emotion determination method of an eighth aspect is executed by a processor. The emotion determination method includes acquiring a facial image of a user, setting an evaluation value for each of plural emotion classifications including a neutral state based on the acquired facial image, computing a correction value using an evaluation value set based on a neutral facial image acquired at a timing corresponding to a neutral state, and determining an emotion of the user by applying the computed correction value to the set evaluation values.

A non-transitory storage medium of a ninth aspect is stored with a program for causing a processor to execute emotion determination processing. The emotion determination processing includes acquiring a facial image of a user, setting an evaluation value for each of plural emotion classifications including a neutral state based on the acquired facial image, computing a correction value using an evaluation value set based on a neutral facial image acquired at a timing corresponding to a neutral state, and determining an emotion of the user by applying the computed correction value to the set evaluation values.

As described above, the emotion determination device, the emotion determination method, and the program according to the present disclosure are capable of precisely determining emotions, even taking into account individual differences in facial expression.

BRIEF DESCRIPTION OF THE DRAWINGS

Exemplary embodiments of the present invention will be described in detail based on the following figures, wherein:

FIG. 5A is a schematic diagram illustrating emotion determination results determined by an emotion determination device according to an exemplary embodiment;

FIG. 5B is a schematic diagram illustrating emotion determination results of a comparative example;

FIG. 7 is a flowchart illustrating a continuation of FIG. 6.

DETAILED DESCRIPTION

Explanation follows regarding an emotion determination device 10 according to an exemplary embodiment, with reference to the drawings.

Figure 1:
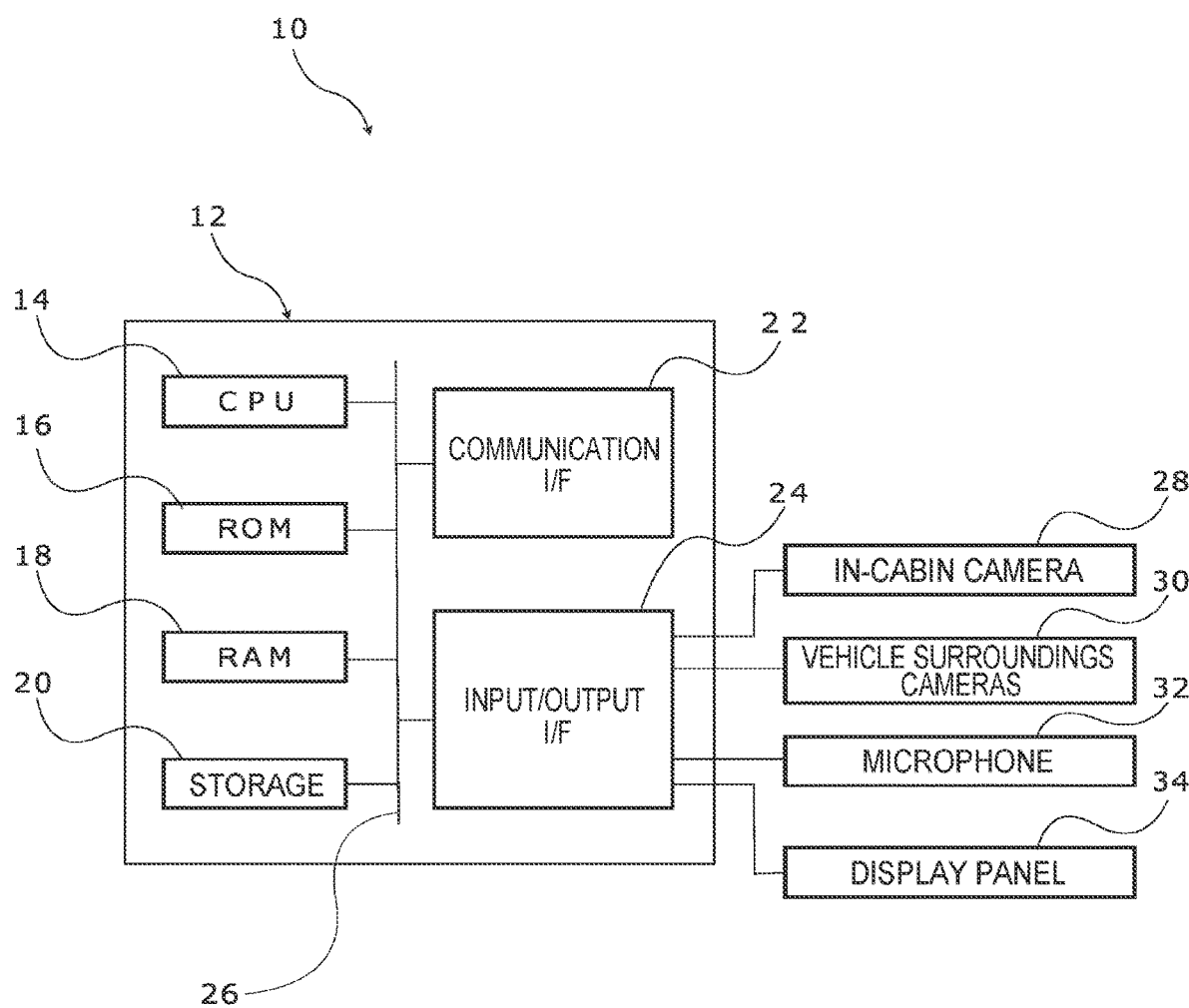
FIG. 1 is a block diagram illustrating a hardware configuration of an emotion determination device according to an exemplary embodiment.

As illustrated in FIG. 1, the emotion determination device 10 of the present exemplary embodiment includes an electronic control unit (ECU) 12, this being a controller installed in a vehicle. Namely, the emotion determination device 10 of the present exemplary embodiment is installed in a vehicle as an example. A user of the emotion determination device 10 therefore corresponds to an occupant of the vehicle.

The ECU 12 is configured including a central processing unit (CPU) 14, read only memory (ROM) 16, random access memory (RAM) 18, storage 20, a communication interface 22, and an input/output interface 24. The respective configurations are connected together through a bus 26 so as to be capable of communicating with each other.

The CPU 14 serving as a processor is a central processing unit that executes various programs and controls various sections. Namely, the CPU 14 reads a program from the ROM 16 serving as memory or from the storage 20 serving as memory, and executes the program using the RAM 18 as a workspace. The CPU 14 performs controls the respective configurations described above and performs various computation processing according to the program stored in the ROM 16 or the storage 20.

The ROM 16 holds various programs and various data. The RAM 18 serves as a workspace for temporary program and data storage. The storage 20 is configured by a hard disk drive (HDD) or a solid state drive (SSD), and configures a non-transitory storage medium that holds various programs, including an operating system, as well as various data. In the present exemplary embodiment, a correction value acquisition program used to acquire a correction value, an emotion determination program, and so on are held in the ROM 16 or the storage 20.

The communication interface 22 is an interface enabling the ECU 12 to communicate over a computer network. For example, the communication interface 22 employs a protocol such as 5G, LTE, Wi-Fi (registered trademark), or Ethernet (registered trademark).

An in-cabin camera 28, vehicle surroundings cameras 30, a microphone 32, and a display panel 34 are electrically connected to the input/output interface 24. The in-cabin camera 28 is an optical camera that captures an occupant inside a vehicle cabin, and as an example, in the present exemplary embodiment the in-cabin camera 28 is installed in an instrument panel in a front section of the vehicle so as to face toward a driver. Video images including the face of the driver are captured by the in-cabin camera 28, and the captured images are transmitted to the ECU 12.

The vehicle surroundings cameras 30 are attached either inside the vehicle cabin or to framework of the vehicle or the like, and are configured so as to be capable of imaging the vehicle surroundings. In the present exemplary embodiment, as an example the vehicle surroundings cameras 30 are configured by two optical cameras, namely an optical camera that captures ahead of the vehicle, and an optical camera that captures rearward from the vehicle. Vehicle forward images and vehicle rearward images captured by the vehicle surroundings cameras 30 are transmitted to the ECU 12.

The microphone 32 is provided inside the vehicle cabin in the vicinity of a driver's seat, and in the present exemplary embodiment, as an example the microphone 32 is configured by a directional microphone directed toward the driver's seat. The microphone 32 therefore picks up sounds uttered by the driver, and the picked-up sounds are transmitted to the ECU 12. Since the microphone 32 is directional, sounds uttered by an occupant seated in a front passenger seat or another seat are either not picked up at all, or barely picked up, by the microphone 32.

The display panel 34 is disposed on the instrument panel or the like, and displays information for occupants, including the driver. For example, the display panel 34 may display information relating to a navigation system, information relating to entertainment, or information relating to alert messages.

Functional Configurations of Emotion Determination Device 10

The emotion determination device 10 employs the aforementioned hardware resources to implement various functionality. Explanation follows regarding functional configurations implemented by the emotion determination device 10 with reference to FIG. 2.

Figure 2:
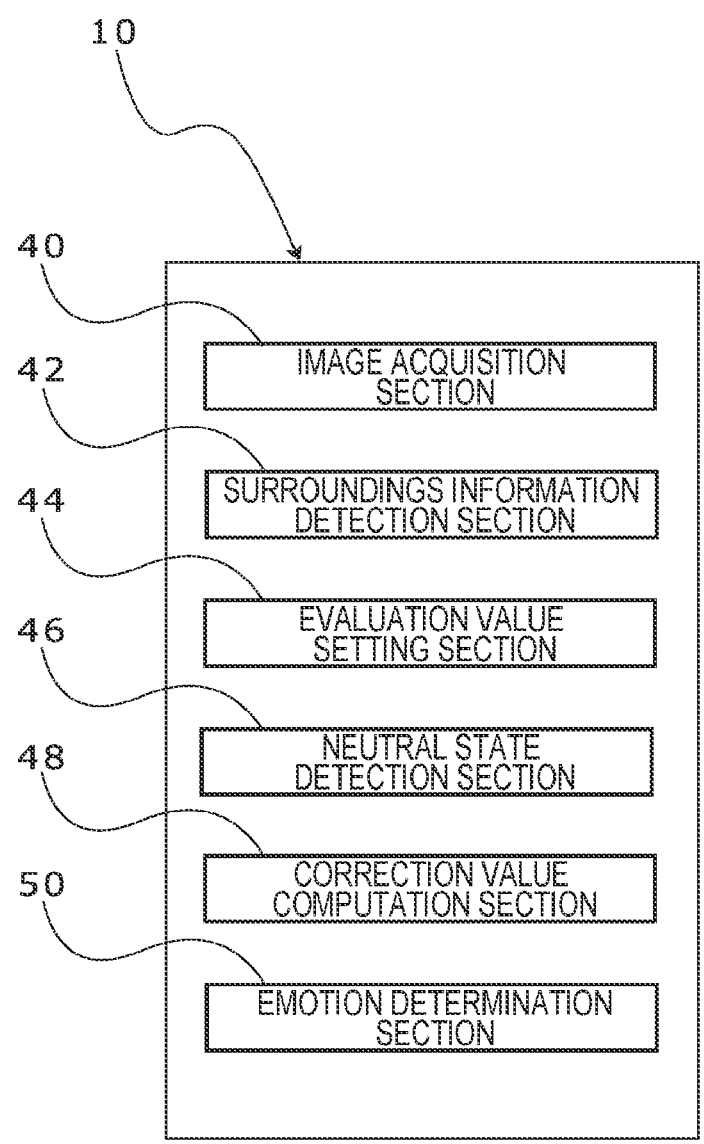
FIG. 2 is a block diagram illustrating a functional configuration of an emotion determination device according to an exemplary embodiment.

As illustrated in FIG. 2, functional configurations of the emotion determination device 10 are configured including an image acquisition section 40, a surroundings information detection section 42, an evaluation value setting section 44, a neutral state detection section 46, a correction value computation section 48, and an emotion determination section 50. These functional configurations are implemented by the CPU 14 reading and executing a program stored in the ROM 16 or the storage 20.

The image acquisition section 40 acquires a facial image of the driver captured by the in-cabin camera 28. The surroundings information detection section 42 detects vehicle surroundings information based on images captured by the vehicle surroundings cameras 30. Specifically, the surroundings information detection section 42 detects other vehicles present to the vehicle front and vehicle rear.

The evaluation value setting section 44 sets an evaluation value for each of plural emotion classifications, including a neutral state, based on the facial image acquired by the image acquisition section 40. In the present exemplary embodiment, as an example the evaluation value setting section 44 sets an evaluation value for each of five emotion classifications, namely "neutral", "happy", "irritated", "nervous", and "tired". Moreover, in the present exemplary embodiment, probabilities of being the respective emotions are employed as the evaluation values, and the five evaluation values are normalized so as to add up to 100%. For example, the evaluation value setting section 44 may set "neutral": 5%, "happy": 40%, "irritated": 50%, "nervous": 5%, and "tired": 0% as evaluation value data, and transmit this to the ECU 12 as a single piece of data. Note that a time interval at which the evaluation value setting section 44 sets the evaluation values may be an interval of several seconds, or may be an interval of several minutes. Alternatively, the evaluation values may be set at predetermined timings, instead of at uniform intervals. For example, a method employing a trained model trained using training data in which facial images of people are grouped with emotions may be employed as the method for setting the evaluation values.

The neutral state detection section 46 detects the driver to be in a neutral state in a case in which the vehicle is in a predetermined travel state and the driver is in a predetermined driving state. In the present exemplary embodiment, as an example the neutral state detection section 46 detects the neutral state in a case in which the vehicle is in a state traveling straight ahead and the driver is in a non-speaking state. The vehicle state may, for example, be determined to be a state in which the vehicle is traveling straight ahead based on vehicle forward images acquired from the vehicle surroundings cameras 30.

The driver state may, for example, be determined to be the non-speaking driver state based on a signal acquired from the microphone 32. In a case in which a directional microphone is similarly installed for another seat, the non-speaking state may be determined in a case in which no utterances have been identified by either microphone.

The correction value computation section 48 computes a correction value Δ using evaluation values set based on a neutral timing facial image acquired by the image acquisition section 40 at a timing corresponding to the neutral state, namely a neutral facial image. Explanation follows regarding a specific computation method employed by the correction value computation section 48 to compute the correction value, with reference to FIG. 5A.

Of the two facial images illustrated above and below one another in FIG. 5A, the upper facial image is a neutral facial image acquired by the image acquisition section 40 at a timing corresponding to the neutral state as detected by the neutral state detection section 46. Data representing the evaluation values set by the evaluation value setting section 44 based on the neutral facial image is illustrated to the right of the neutral facial image.

The evaluation value data in this case is "neutral": 40%, "happy": 0%, "irritated": 50%, "nervous": 5%, and "tired": 5%. Namely, despite being in the neutral state, the emotion "irritated" has been set with a higher evaluation value than "neutral". Accordingly, in such cases in which the emotion corresponding to the highest evaluation value of the evaluation values set by the evaluation value setting section 44 based on the neutral facial image is another emotion other than the neutral state, the correction value computation section 48 computes as the correction value Δ the difference between the evaluation value for the other emotion and the evaluation value for the neutral state.

Namely, in the example of FIG. 5A, the emotion corresponding to the highest evaluation value is "irritated", and so "irritated" corresponds to the other emotion. Accordingly, the correction value computation section 48 computes the correction value Δ to be 10%, this being the difference between the evaluation value of 50% for "irritated" and the evaluation value of 40% for "neutral". The correction value Δ computed by the correction value computation section 48 is then held in the storage 20 configuring a storage section. The fact that the other emotion that was set with a higher evaluation value than "neutral" when in the neutral state was "irritated" is also held in the storage 20. Namely, the fact that the other emotion was "irritated", and the fact that the correction value Δ is 10%, are stored.

As illustrated in FIG. 2, the emotion determination section 50 determines an emotion of the user by applying the correction value Δ computed by the correction value computation section 48 to the evaluation values set for the respective emotions by the evaluation value setting section 44. Explanation follows regarding a specific computation method employed in emotion determination by the emotion determination section 50, with reference to FIG. 5A.

Of the two facial images illustrated above and below one another in FIG. 5A, the lower facial image is a facial image acquired by the image acquisition section 40 at a predetermined timing. Data representing the evaluation values set by the evaluation value setting section 44 is illustrated to the right of the facial image.

The evaluation value data in this case is neutral: 5%, "happy": 40%, "irritated": 50%, nervous: 5%, and "tired": 0%. Namely, since "irritated" has the highest evaluation value, the emotion of the driver would be determined to be "irritated" before applying the correction value Δ.

Note that the emotion determination section 50 of the present exemplary embodiment only applies the correction value Δ in a case in which the emotion set with the highest evaluation value by the evaluation value setting section 44 is the other emotion. In the example of the lower facial image in FIG. 5A, the emotion stored as the other emotion is "irritated". Since this matches the emotion set with the highest evaluation value, the correction value Δ is applied. On the other hand, in a case in which the emotion set with the highest evaluation value by the evaluation value setting section 44 is an emotion other than the other emotion, the emotion determination section 50 does not apply the correction value Δ. For example, in a case in which the emotion stored as the other emotion is "irritated", and the emotion set with the highest evaluation value is "happy", the correction value Δ is not applied.

In a case in which the difference between the evaluation value for a second-placed emotion, corresponding to the second highest evaluation value, and the evaluation value of the other emotion is either the same as the correction value Δ or less than the correction value Δ, the emotion determination section 50 determines the emotion of the user to be the second-placed emotion. In the example of the lower facial image in FIG. 5A, the second-placed emotion corresponding to the second highest evaluation value is "happy", having an evaluation value of 40%. The difference to the evaluation value for "irritated", this being the other emotion, is thus 50%−40%=10%.

Since the correction value Δ computed by the correction value computation section 48 is 10%, this is the same as the difference between the evaluation values. On applying the correction value Δ, the emotion determination section 50 therefore determines the emotion of the driver to be "happy", this being the second-placed emotion. On the other hand, suppose the difference were 15%. In such a case, since the difference is larger than the correction value Δ, the emotion determination section 50 would determine the emotion of the driver to be the other emotion that has the highest evaluation value.

Operation

Explanation follows regarding operation of the present exemplary embodiment.

Example of Correction Value Acquisition Processing

Figure 3:
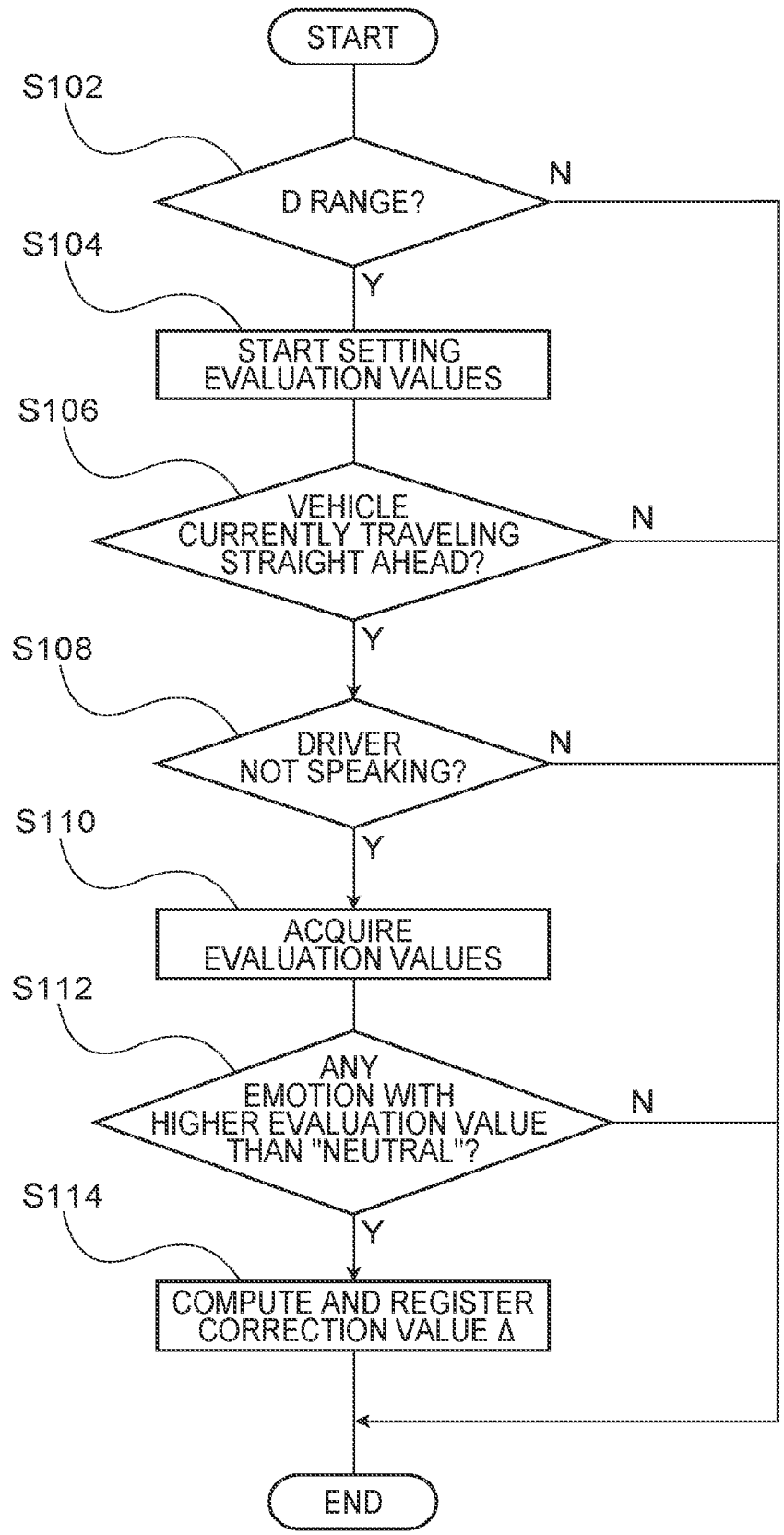
FIG. 3 is a flowchart illustrating an example of a flow of correction value acquisition processing performed by an emotion determination device according to an exemplary embodiment.

FIG. 3 is a flowchart illustrating an example of a flow of correction value acquisition processing performed by the emotion determination device 10. The correction value acquisition processing is executed by the CPU 14 reading a program from the ROM 16 or the storage 20 and expanding and executing the program in the RAM 18. In the present exemplary embodiment, as an example the correction value acquisition processing is performed at predetermined intervals either after the ignition has been switched on, or after the power has been switched on. Once a correction value Δ has been registered, the correction value acquisition processing is not performed again before driving of the vehicle has ended. Namely, the correction value Δ is registered a single time on each occasion the vehicle is driven.

As illustrated in FIG. 3, at step S102, the CPU 14 determines whether or not a shift range of the vehicle is set to a D range. Specifically, the CPU 14 receives a shift range signal in order to determine the current shift range. Processing transitions to step S104 in a case in which the CPU 14 determines the shift range to be the D range, and the correction value acquisition processing is ended in a case in which the CPU 14 determines the shift range not to be the D range.

At step S104, the CPU 14 uses the evaluation value setting section 44 to implement evaluation value setting processing. Namely, in the present exemplary embodiment, setting of the evaluation values commences once the vehicle has been placed in a travel-enabled state. The CPU 14 then transitions to the processing of step S106.

At step S106, the CPU 14 determines whether or not the vehicle is currently traveling straight ahead. Specifically, the CPU 14 uses the functionality of the neutral state detection section 46 to determine that the vehicle is currently traveling straight ahead in a case in which the road ahead of the vehicle is a curve-free road based on a signal from the vehicle surroundings cameras 30. Processing transitions to step S108 in a case in which the CPU 14 determines that the vehicle is currently traveling straight ahead. On the other hand, the correction value acquisition processing is ended in a case in which the CPU 14 determines that the vehicle is not currently traveling straight ahead, for example when the CPU 14 determines that the vehicle is turning left or right or traveling around a curve.

At step S108, the CPU 14 determines whether or not an occupant is not speaking. Specifically, the CPU 14 uses the functionality of the neutral state detection section 46 to determine that the driver is not speaking in a case in which the microphone 32 is not picking up sounds from the driver. Processing transitions to step S110 in a case in which the CPU 14 determines that the driver is not speaking. On the other hand, the correction value acquisition processing is ended in a case in which the CPU 14 determines that the driver is speaking, for example when the microphone 32 is picking up sounds from the driver.

At step S110, the CPU 14 acquires evaluation values. Specifically, the CPU 14 acquires the evaluation values set by the functionality of the evaluation value setting section 44. Note that the evaluation value setting section 44 sets the evaluation values based on a neutral facial image captured when the vehicle is in a state traveling straight ahead and the driver is in the non-speaking neutral state.

Next, at step S112, the CPU 14 determines whether or not any emotion has an evaluation value higher than that of "neutral". Namely, the CPU 14 determines whether or not the emotion with the highest evaluation value is another emotion other than "neutral". The CPU 14 processing transitions to the processing of step S114 in a case in which an evaluation value higher than the evaluation value of "neutral" is present among the respective emotion evaluation values acquired at step S110. For example, processing would transition to step S114 in the case of the upper facial image in FIG. 5A, since "irritated" has a higher evaluation value than "neutral". On the other hand, the CPU 14 ends the correction value acquisition processing without acquiring a correction value in a case in which no evaluation value is higher than the evaluation value of "neutral", namely in a case in which the evaluation value for "neutral" is the highest evaluation value.

At step S114, the CPU 14 computes the correction value Δ and registers the correction value Δ in the storage 20 as illustrated in FIG. 3. Specifically, the correction value Δ is computed by the functionality of the correction value computation section 48 (a correction value computation step). In the case of the upper facial image in FIG. 5A, the correction value Δ is 50%-40%=10%. The other emotion is registered as "irritated", and the correction value Δ is registered as 10%. The CPU 14 then ends the correction value acquisition processing.

Example of Emotion Determination Processing

Figure 4:
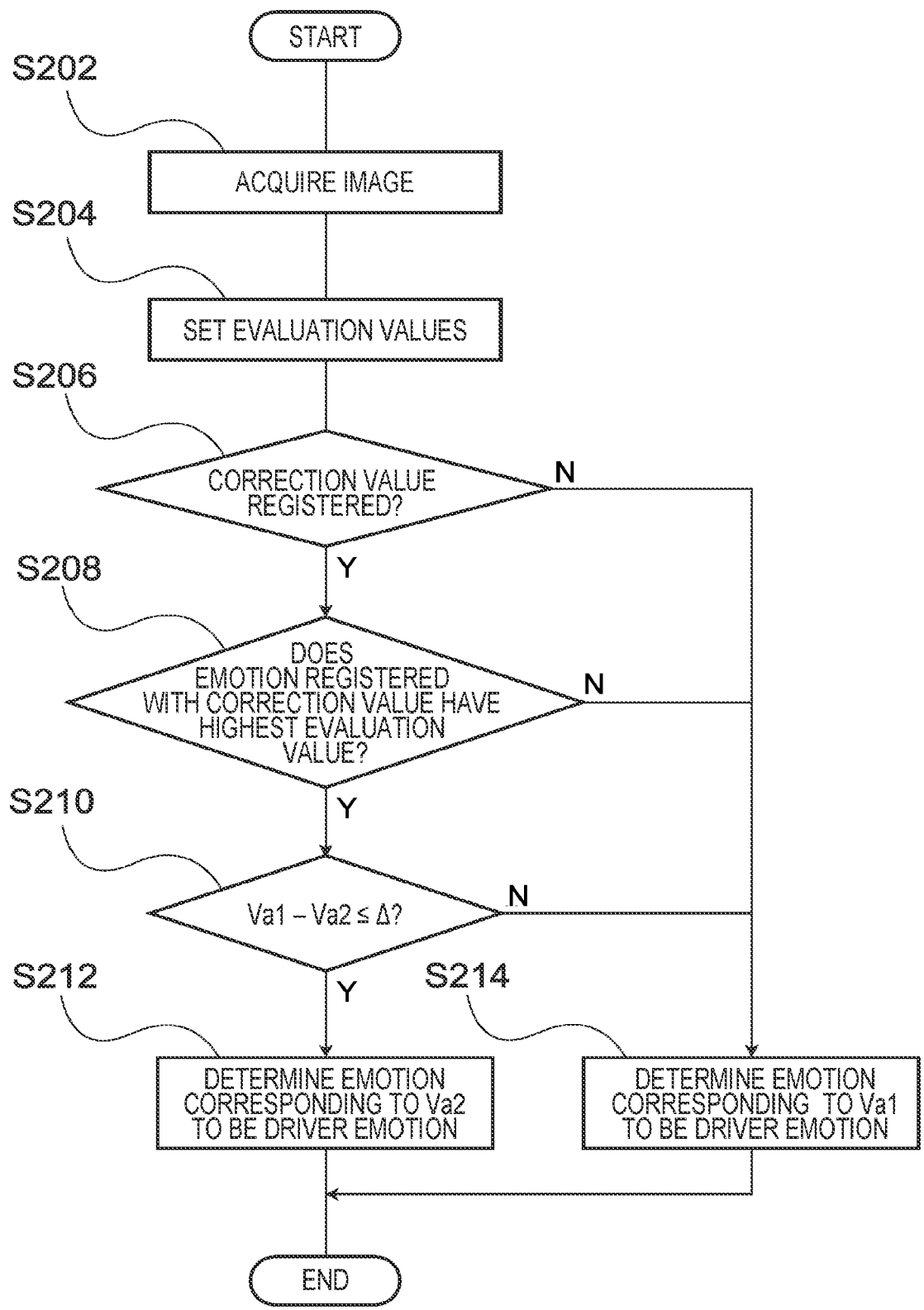
FIG. 4 is a flowchart illustrating an example of a flow of emotion determination processing performed by an emotion determination device according to an exemplary embodiment.

FIG. 4 is a flowchart illustrating an example of a flow of emotion determination processing by the emotion determination device 10. The emotion determination processing is executed by the CPU 14 reading a program from the ROM 16 or the storage 20 and expanding and executing the program in the RAM 18. The emotion determination processing is executed at intervals of from several seconds to several minutes after the vehicle has been started up.

At step S202, the CPU 14 acquires an image. Specifically, the CPU 14 uses the functionality of the image acquisition section 40 to acquire a facial image of the driver (image acquisition step).

At step S204, the CPU 14 sets the evaluation values. Specifically, the CPU 14 uses the functionality of the evaluation value setting section 44 to set the evaluation values based on the facial image of the driver (evaluation value setting step). Note that in the following explanation, of the evaluation values set at step S204, the highest emotion evaluation value is referred to as Va1, and the second-placed emotion evaluation value for the second highest emotion is referred to as Va2.

At step S206, the CPU 14 determines whether or not a correction value Δ has been registered. Processing transitions to step S208 in a case in which the CPU 14 determines that a correction value Δ computed by the processing of the correction value computation section 48 has been registered. Processing transitions to step S214 in a case in which the CPU 14 determines that a correction value Δ has not been registered. The processing of step S214 will be described later.

At step S208, the CPU 14 determines whether or not the emotion registered with the correction value has the highest evaluation value. Namely, processing transitions to step S210 in a case in which the CPU 14 determines that the emotion corresponding to Va1 set at step S204 is the same as the emotion registered with the correction value. Alternatively, processing transitions to step S214 in a case in which the CPU 14 determines that the emotion corresponding to Va1 differs from the emotion registered with the correction value. The processing of step S214 will be described later.

At step S210, the CPU 14 determines whether or not the difference between Va1 and Va2 is the correction value Δ or less. The CPU 14 transitions to the processing of step S212 in a case in which the difference between Va1 and Va2 is the correction value Δ or less. Alternatively, the CPU 14 transitions to the processing of step S214 in a case in which the difference between Va1 and Va2 is greater than the correction value Δ.

At step S212, the CPU 14 determines the emotion of the driver to be the emotion corresponding to Va2 (emotion determination step). For example, in the example of the lower facial image in FIG. 5A, Va1 is 50, namely the evaluation value for "irritated", and Va2 is 40, namely the evaluation value for "happy." Since the difference is 10, this being the same as the correction value Δ, the emotion of the driver is determined to be "happy" corresponding to Va2.

On the other hand, processing transitions to step S214 in a case in which the CPU 14 determines at step S206 that a correction value has not been registered, in a case in which the CPU 14 determines at step S208 that the emotion corresponding to Va1 is different from the emotion registered with the correction value Δ, and in a case in which the CPU 14 determines at step S210 that the difference between Va1 and Va2 is greater than the correction value Δ. At step S214, the CPU 14 determines the emotion of the driver to be the emotion corresponding to Va1 (emotion determination step). The CPU 14 then ends the emotion determination processing.

As described above, in the emotion determination device 10 according to the present exemplary embodiment, the emotion determination section 50 applies the correction value Δ to the respective emotion evaluation values set by the evaluation value setting section 44 in order to determine the emotion of the user. By taking the facial expression of the user when in the neutral state as a reference, and employing the evaluation values set based on the facial image corresponding to the neutral state, evaluation values can be suppressed from varying as a result of individual differences. This enables emotions to be precisely determined, even taking into account individual differences in facial expression. Moreover, errors when determining emotion arising as a result of individual differences can be suppressed in comparison to cases in which emotions are determined based solely on a trained model.

Moreover, in the present exemplary embodiment, of the evaluation values set based on the neutral facial image, if the emotion corresponding to the highest evaluation value corresponds to another emotion other than the neutral state, the correction value computation section 48 sets the difference between the evaluation value for the other emotion and the evaluation value for the neutral state as the correction value Δ. This enables divergence in emotions determined by the emotion determination section 50 between the neutral state of the user and a neutral state of a general model to be corrected.

Moreover, in the present exemplary embodiment, the correction value is applied in a case in which the emotion set with the highest evaluation value by the evaluation value setting section 44 is the other emotion. This enables the difference between the evaluation values for a user and evaluation values for a general model to be suitably absorbed. On the other hand, the correction value is not applied in a case in which the emotion set with the highest evaluation value by the evaluation value setting section 44 is an emotion other than the other emotion. In such cases, the emotion is determined by the emotion determination section 50 based on the evaluation values for a general model.

Furthermore, in the case of a user who has a facial expression close to that of another emotion when in the neutral state, the other emotion would be incorrectly determined if the correction value Δ were not applied. To address this, in the present exemplary embodiment the emotion of the user is taken to be the second-placed emotion in a case in which the difference between the evaluation value for the second-placed emotion and the evaluation value for the other emotion is either the same as the correction value Δ or less than the correction value Δ. This enables emotions to be determined more accurately, even for users with evaluation values that differ from those of a general model in the neutral state. Explanation follows regarding this point, with reference to FIG. 5B.

FIG. 5B illustrates an emotion determination method of a comparative example, this being a method in which evaluation values are set by the evaluation value setting section 44 and the emotion of the driver is determined to be the emotion corresponding to the highest evaluation value. In this example, although the driver is in the neutral state, the facial image is deemed to show more "irritation" than that of a general model in the neutral state. Accordingly, in the emotion determination method of the comparative example, the emotion of the driver would be determined to be "irritated".

By contrast, in the present exemplary embodiment, the other emotion and the second-placed emotion are respectively "irritated" and "happy". In a case in which the difference between the evaluation values for these emotions is the same as or less than the correction value Δ, the emotion of the driver can be determined to be "happy", this being the second-placed emotion.

Moreover, in the present exemplary embodiment, the facial image taken as the neutral facial image is acquired based on the travel state of the vehicle and the driving state of the driver. This enables a facial image of the neutral state to be acquired with better precision than in a case in which the neutral facial image is acquired based on only one of the travel state or the driving state. In particular, taking as the neutral facial image a facial image acquired in a state in which the vehicle is traveling straight ahead and a state in which the driver is not speaking enables a facial image of the neutral state to be acquired with better precision than in a case in which, for example, a facial image is acquired at the timing corresponding to a left or right turn. Since a non-speaking state is more likely to represent the neutral state than a speaking state, this also enables a facial image of the neutral state to be acquired with good precision.

Note that in the exemplary embodiment described above, a state in which the vehicle is traveling straight ahead and a state in which the driver is not speaking are set as conditions for acquisition of the neutral facial image. However, there is no limitation thereto, and further conditions may be applied in order to improve the precision with which the neutral state is detected. Moreover, although configuration is made in which the correction value Δ is computed and registered a single time on each occasion the vehicle is driven in the exemplary embodiment described above, there is no limitation thereto. For example, the correction value acquisition processing illustrated in FIG. 6 and FIG. 7 may be adopted.

Alternative Example of Correction Value Acquisition Processing

Figure 6:
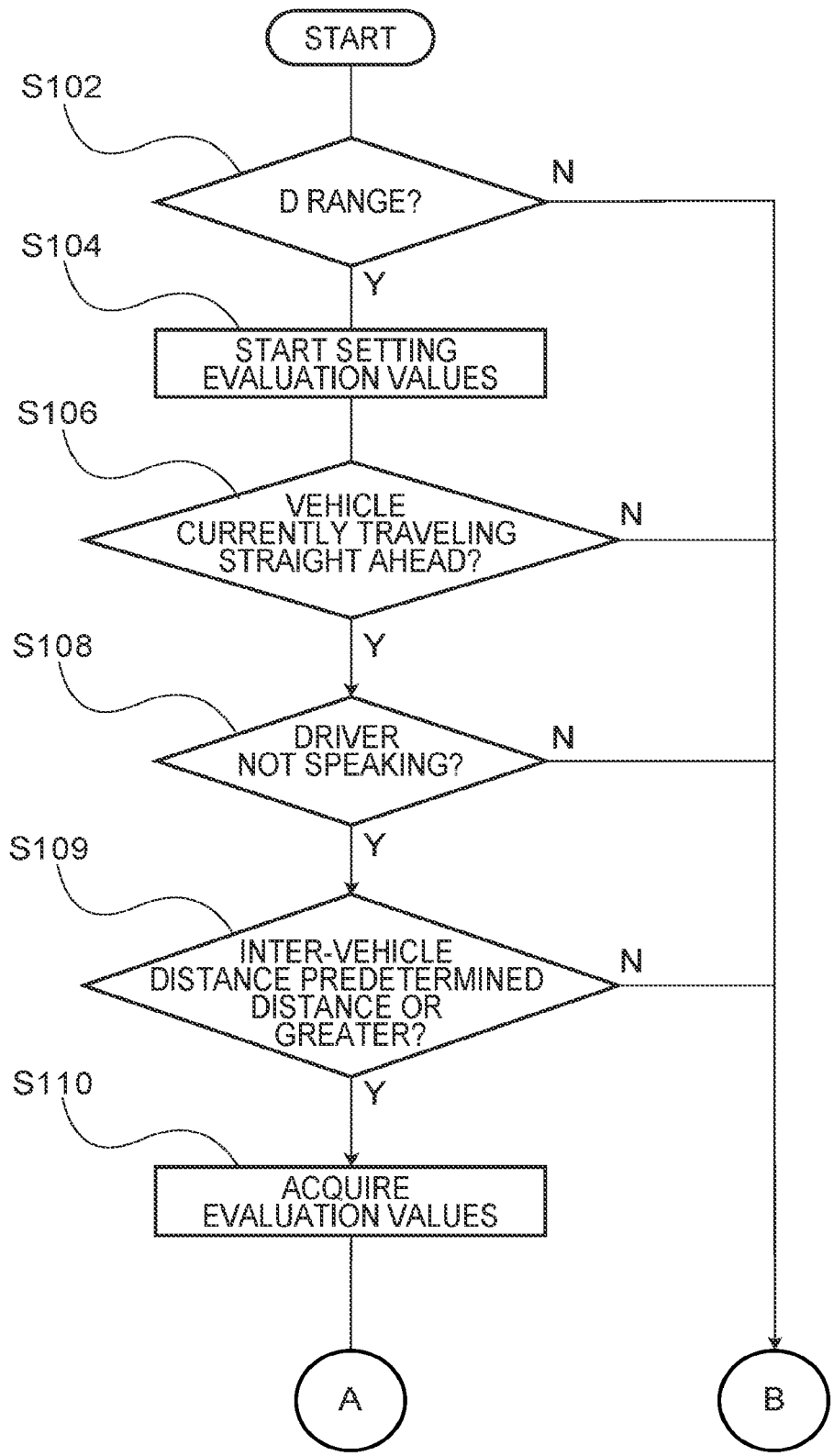
FIG. 6 is a flowchart illustrating part of another example of a flow of correction value acquisition processing by an emotion determination device according to an exemplary embodiment.

FIG. 6 and FIG. 7 are flowcharts illustrating an alternative example of a flow of the correction value acquisition processing performed by the emotion determination device 10. This correction value acquisition processing is executed by the CPU 14 reading a program from the ROM 16 or the storage 20 and expanding and executing the program in the RAM 18. In the following explanation, explanation of processing that is similar to that of the correction value acquisition processing described in the above exemplary embodiment will be omitted as appropriate.

As illustrated in FIG. 6, the CPU 14 executes the processing from step S102 to step S108 similarly to that in the flowchart of FIG. 3. The CPU 14 then transitions to the processing of step S109 in a case in which the driver has been determined not to be speaking at step S108.

At step S109, the CPU 14 determines whether or not inter-vehicle distance is a predetermined distance or greater. Specifically, the CPU 14 uses the functionality of the surroundings information detection section 42 to measure the inter-vehicle distance to another vehicle traveling in front as captured by the vehicle surroundings cameras 30. The CPU 14 also uses the functionality of the surroundings information detection section 42 to measure the inter-vehicle distance to another vehicle traveling behind as captured by the vehicle surroundings cameras 30. The CPU 14 then determines the inter-vehicle distance to be the predetermined distance or greater and transitions to the processing of step S110 in a case in which the inter-vehicle distances to the front and rear of the ego vehicle are the predetermined distance or greater.

In this manner, the neutral state can be detected with better precision due to adding the inter-vehicle distance as a condition of the neutral state. Namely, it is common for the inter-vehicle distance to a vehicle ahead to shrink when experiencing a non-neutral emotion, such as irritation. Likewise, it is common to experience an emotion other than a neutral state when being tailgated by the vehicle behind. Adding the inter-vehicle distance as a condition of the neutral state thus enables the likelihood of being in the neutral state to be raised.

As illustrated in FIG. 7, at step S112, the CPU 14 determines whether or not any emotion has a higher evaluation value than that of "neutral". The CPU 14 transitions to the processing of step S113 in a case in which an evaluation value higher than the evaluation value of "neutral" is present among the respective emotion evaluation values acquired at step S110.

At step S113, the CPU 14 computes the correction value Δ. The CPU 14 then transitions to the processing of step S116 and determines whether or not the correction value Δ is less than a predetermined value. This predetermined value is set to a value that diverges greatly from a normal range. Accordingly, in a case in which the correction value Δ is the predetermined value or greater, it may be determined that the neutral state has been incorrectly detected.

The CPU 14 transitions to the processing of step S118 in a case in which the correction value Δ is less than the predetermined value at step S116, and registers the correction value Δ similarly to in the exemplary embodiment described above.

The CPU 14 transitions to the processing of step S120 in a case in which the correction value Δ is determined to be the predetermined value or greater at step S116. At step S120, the CPU 14 ends the correction value acquisition processing without registering the correction value Δ. So doing enables the registration of an incorrect correction value Δ to be suppressed.

Although explanation has been given regarding the emotion determination device 10 according to an exemplary embodiment, obviously various modifications may be implemented within a range not departing from the spirit of the present disclosure. For example, although the above exemplary embodiment employs the five emotion classifications of "neutral", "happy", "irritated", "nervous", and "tired", there is no limitation thereto. More emotion classifications may be employed to include emotion classifications such as "surprised", "angry", and "sad". Conversely, four or fewer emotion classifications may be employed.

Although determination that the vehicle is in a state traveling straight ahead is made based on a vehicle forward image acquired from the vehicle surroundings cameras 30 in the exemplary embodiment described above, there is no limitation thereto, and another method may be used to determine that the vehicle is traveling straight ahead. For example, the vehicle may be determined to be in a state traveling straight ahead by detecting a steering angle. Alternatively, in a case in which a travel route has been set on the navigation system, the vehicle may be determined to be in a state traveling straight ahead based on information regarding the travel route.

Although the driver not speaking is set as a condition of the neutral state in the exemplary embodiment described above, there is no limitation thereto. For example, a biometric sensor may installed in the driver's seat, and determination as to whether or not the driver is in the neutral state may be made by acquiring information regarding a pulse rate or breathing state from the biometric sensor.

Moreover, although in the exemplary embodiment described above the emotion determination section 50 determines the emotion of the user to be the second-placed emotion in a case in which the difference between Va1 and Va2 is either the same as the correction value Δ or less than the correction value Δ, there is no limitation thereto. For example, the second-placed emotion may be determined to be the emotion of the user only in a case in which the difference between Va1 and Va2 is less than the correction value Δ. In a case in which the difference between Va1 and Va2 is the same as the correction value Δ, the emotion of the user may be determined to be both the emotion corresponding to Va1 and the second-placed emotion corresponding to Va2.

Although explanation has been given regarding a case in which the emotion determination device 10 is applied in a vehicle in the exemplary embodiment described above, there is no limitation thereto. The emotion determination device 10 may be employed to determine user emotions in a broad range of situations, such as in the home or in a hospital.

The correction value acquisition processing and the emotion determination program processing executed by the CPU 14 reading software (a program) in the exemplary embodiment and modified example described above may be executed by various types of processor other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The correction value acquisition processing and the emotion determination program processing may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

Moreover, although the storage 20 configures a storage section in the exemplary embodiment described above, there is no limitation thereto. For example, various programs may be stored and circulated on a non-transitory storage medium such as a compact disc (CD), a digital versatile disc (DVD), or universal serial bus (USB) memory. Alternatively, a program may be provided in a format downloadable from an external device over a network.

What is claimed is:

1. An emotion determination device comprising:
   a memory; and
   a processor coupled to the memory, the processor being configured to:
      acquire a facial image of a user;
      set an evaluation value for each of a plurality of emotion classifications including a neutral emotion based on the acquired facial image;
      compute a difference between an evaluation value for a non-neutral emotion and an evaluation value for the neutral emotion as a correction value based on information that a highest evaluation value among a plurality of evaluation values preset based on a neutral facial image acquired at a timing corresponding to a neutral state is the non-neutral emotion;
      determine whether or not an emotion set with a highest evaluation value among the set evaluation values is the non-neutral emotion;
      apply the correction value to the highest evaluation value among the set evaluation values based on determining that the emotion set with the highest evaluation value among the set evaluation values is the non-neutral emotion;
      not apply the correction value to the highest evaluation value among the set evaluation values based on determining that the emotion set with the highest evaluation value among the set evaluation values is not the non-neutral emotion; and
      determine an emotion of the user using the set evaluation values after applying or not applying the correction value to the highest evaluation value among the set evaluation values.

2. The emotion determination device of claim 1, wherein the processor is configured to, in a case in which the emotion set with the highest evaluation value among the set evaluation values is the non-neutral emotion, determine the emotion of the user to be a second-placed emotion corresponding to a second highest evaluation value among the set evaluation values in a case in which a difference between the second highest evaluation value and the highest evaluation value is either the same as the correction value or less than the correction value.

3. The emotion determination device of claim 1, wherein the processor is further configured to acquire a facial image of a driver as the neutral facial image in a case in which a vehicle is in a predetermined travel state and a driver is in a predetermined driving state.

4. The emotion determination device of claim 3, wherein the predetermined travel state is a state in which the vehicle is traveling straight ahead.

5. The emotion determination device of claim 3, wherein the predetermined driving state is a state in which the driver is not speaking.

6. An emotion determination method performed by a processor, the method comprising:
   acquiring a facial image of a user;
   setting an evaluation value for each of a plurality of emotion classifications including a neutral emotion based on the acquired facial image;
   computing a difference between an evaluation value for a non-neutral emotion and an evaluation value for the neutral emotion as a correction value based on information that a highest evaluation value among a plurality of evaluation values preset based on a neutral facial image acquired at a timing corresponding to a neutral state is the non-neutral emotion;
   determining whether or not an emotion set with a highest evaluation value among the set evaluation values is the non-neutral emotion;
   applying the correction value to the highest evaluation value among the set evaluation values based on determining that the emotion set with the highest evaluation value among the set evaluation values is the non-neutral emotion;
   not applying the correction value to the highest evaluation value among the set evaluation values based on determining that the emotion set with the highest evaluation value among the set evaluation values is not the non-neutral emotion; and
   determining an emotion of the user using the set evaluation values after applying or not applying the correction value to the highest evaluation value among the set evaluation values.

7. The emotion determination method of claim 6, further comprising, determining, in a case in which the emotion set with the highest evaluation value among the set evaluation values is the non-neutral emotion, determine the emotion of the user to be a second-placed emotion corresponding to a second highest evaluation value among the set evaluation values in a case in which a difference between the second highest evaluation value and the highest evaluation value is either the same as the correction value or less than the correction value.

8. The emotion determination method of claim 6, further comprising acquiring a facial image of a driver as the neutral facial image in a case in which a vehicle is in a predetermined travel state and a driver is in a predetermined driving state.

9. A non-transitory storage medium storing a program executable by a processor to perform emotion determination processing, the emotion determination processing comprising:
   acquiring a facial image of a user;
   setting an evaluation value for each of a plurality of emotion classifications including a neutral emotion based on the acquired facial image;
   computing a difference between an evaluation value for a non-neutral emotion and an evaluation value for the neutral emotion as a correction value based on information that a highest evaluation value among a plurality of evaluation values preset based on a neutral facial image acquired at a timing corresponding to a neutral state is the non-neutral emotion;
   determining whether or not an emotion set with a highest evaluation value among the set evaluation values is the non-neutral emotion;
   applying the correction value to the highest evaluation value among the set evaluation values based on determining that the emotion set with the highest evaluation value among the set evaluation values is the non-neutral emotion;
   not applying the correction value to the highest evaluation value among the set evaluation values based on determining that the emotion set with the highest evaluation value among the set evaluation values is not the non-neutral emotion; and
   determining an emotion of the user using the set evaluation values after applying or not applying the correction value to the highest evaluation value among the set evaluation values.

10. The non-transitory storage medium of claim 9, wherein the emotion determination processing further comprises determining, in a case in which the emotion set with the highest evaluation value among the set evaluation values is the non-neutral emotion, the emotion of the user to be a second-placed emotion corresponding to a second highest evaluation value among the set evaluation values in a case in which a difference between the second highest evaluation value and the highest evaluation value is either the same as the correction value or less than the correction value.

11. The non-transitory storage medium of claim 9, wherein the emotion determination processing further comprises acquiring a facial image of a driver as the neutral facial image in a case in which a vehicle is in a predetermined travel state and a driver is in a predetermined driving state.

* * * * *